(12) United States Patent
Lindmark

(10) Patent No.: US 12,737,846 B2
(45) Date of Patent: Sep. 15, 2026

(54) ITERATIVE BACKGROUND GENERATION FOR VIDEO STREAMS

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/237,563

(22) Filed: Aug. 24, 2023

(65) Prior Publication Data

US 2025/0069190 A1 Feb. 27, 2025

(51) Int. Cl.

| | |
|---|---|
| ***G06T 5/50*** | (2006.01) |
| ***G06T 5/77*** | (2024.01) |
| ***G06T 7/11*** | (2017.01) |
| ***G06T 7/194*** | (2017.01) |

(52) U.S. Cl.

CPC .................. *G06T 5/50* (2013.01); *G06T 5/77* (2024.01); *G06T 7/11* (2017.01); *G06T 7/194* (2017.01); *G06T 2207/10016* (2013.01); *G06T 2207/20021* (2013.01); *G06T 2207/20081* (2013.01); *G06T 2207/20212* (2013.01)

(58) Field of Classification Search

CPC ..... G06T 5/50; G06T 5/77; G06T 7/11; G06T 7/194; G06T 2207/10016; G06T 2207/20021; G06T 2207/20081; G06T 2207/20212; G06T 2207/20084; G06T 2207/30196; G06T 5/60

USPC ......... 348/14.12, 14.03, 14.02, 14.08, 14.09, 348/14.1, 14.77, 14.78

See application file for complete search history.

(56) References Cited

U.S. PATENT DOCUMENTS

| | | | | |
|---|---|---|---|---|
| 11,869,274 | B2 * | 1/2024 | Cower | H04N 19/21 |
| 2022/0383034 | A1 * | 12/2022 | Sommerlade | G06V 10/82 |
| 2023/0005159 | A1 * | 1/2023 | Dal Zotto | G06T 7/254 |

FOREIGN PATENT DOCUMENTS

| | | | | |
|---|---|---|---|---|
| EP | 4105878 A1 | * | 12/2022 | G06T 5/50 |
| KR | 20160057867 A | * | 5/2016 | H04N 5/2621 |

* cited by examiner

*Primary Examiner* — Duc Nguyen
*Assistant Examiner* — Carissa A Jones
(74) *Attorney, Agent, or Firm* — Lowenstein Sandler LLP

(57) ABSTRACT

Systems and methods for iterative background generation for video streams are provided. A first background layer and a first foreground layer of a first frame of a video stream are determined. A second background layer and a second foreground layer of a second frame of the video stream are determined. The first and second background layers are combined. The combined background layer includes a region obscured by both the first and the second foreground layers. An inpainting of the obscured region is performed to obtain an image of the obscured region.

17 Claims, 7 Drawing Sheets

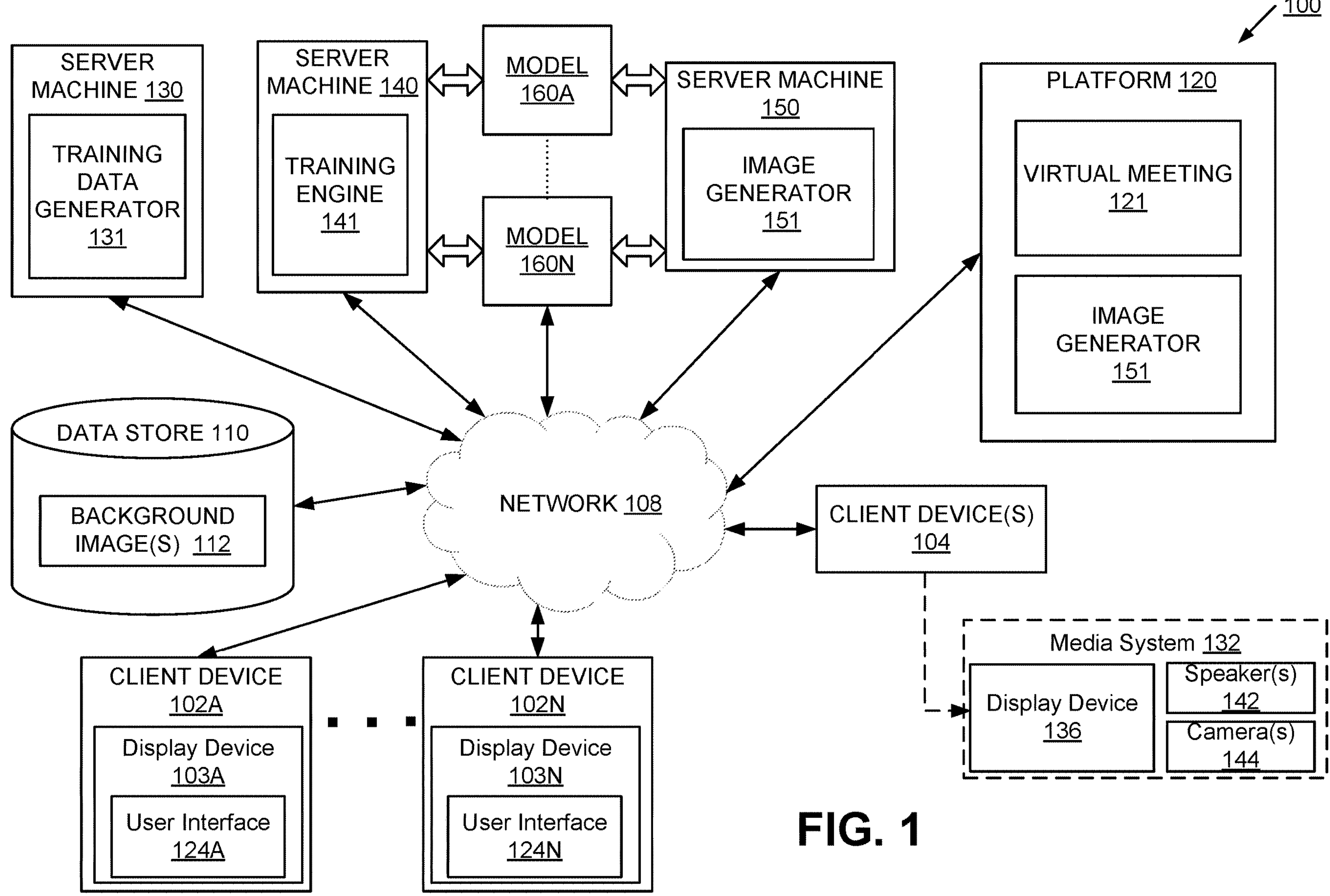
100
SERVER MACHINE 130
TRAINING DATA GENERATOR 131
SERVER MACHINE 140
TRAINING ENGINE 141
MODEL 160A
MODEL 160N
SERVER MACHINE 150
IMAGE GENERATOR 151
PLATFORM 120
VIRTUAL MEETING 121
IMAGE GENERATOR 151
DATA STORE 110
BACKGROUND IMAGE(S) 112
NETWORK 108
CLIENT DEVICE(S) 104
Media System 132
Display Device 136
Speaker(s) 142
Camera(s) 144
CLIENT DEVICE 102A
Display Device 103A
User Interface 124A
CLIENT DEVICE 102N
Display Device 103N
User Interface 124N
FIG. 1

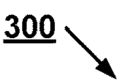

Determine a first background layer and a first foreground layer of a first frame of video stream provided by a client device associated with a participant of multiple of participants of a video conference
302

Determine a second background layer and a second foreground layer of a second frame of the video stream
304

Combine the first background layer and the second background layer to obtain combined background layer, wherein the combined background layer includes a region obscured by both the first foreground layer and the second foreground layer
306

Perform, using a generative machine learning model, an inpainting of the obscured region to obtain an image of the obscured region
308

Modify, using the image of the obscured region and the combined background layer, background layers of subsequent frames of the video stream
310

Provide the video stream with modified background layers for presentation on one or more client devices of one or more of the multiple participants of the video conference.
312

FIG. 3

ITERATIVE BACKGROUND GENERATION FOR VIDEO STREAMS

TECHNICAL FIELD

Aspects and implementations of the present disclosure relate to iterative background generation of video streams.

BACKGROUND

Virtual meetings can take place between multiple participants via a virtual meeting platform. A virtual meeting platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface to display the video streams of participating client devices. Some virtual meeting platforms include tools to perform various operations (e.g., background replacement) on background images associated with a video stream.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes iterative background generation of video streams using a generative machine learning model for image inpainting. In an implementation, the method includes determining a first background layer and a first foreground layer of a first frame of video stream provided by a client device associated with a participant of multiple participants of a video conference. The method further includes determining a second background layer and a second foreground layer of a second frame of the video stream. The method further includes combining the first background layer and the second background layer to obtain combined background layer. The combined background layer includes a region obscured by both the first foreground layer and the second foreground layer. The method further includes performing, using a generative machine learning model, an inpainting of the obscured region to obtain an image of the obscured region. The method further includes modifying, using the image of the obscured region and the combined background layer, background layers of subsequent frames of the video stream. The method further includes providing the video stream with modified background layers for presentation on one or more client devices of one or more of the plurality of participants of the video conference.

In some embodiments, to determine the first background layer and the first foreground layer of the video stream, the method includes providing the first frame of the video stream as input to a machine learning model. The machine learning model is trained to predict, based on a given frame, segmentation labels for the given frame that represent foreground and background regions of the given frame. The method further includes obtaining outputs from the machine learning model. The outputs include one or more background regions and one or more foreground regions. The method further includes combining the one or more background regions to obtain the first background layer. The method further includes combining the one or more foreground regions to obtain the first foreground layer.

In some embodiments, the method includes performing iterative modifications on the image for subsequent frames of the video stream as portions of the obscured region are revealed. In some embodiments, to perform iterative modifications on the image for subsequent frames of the video stream as portions of the obscured region are revealed, the method includes determining a third background layer of the of a third frame of the video stream. The method further includes determining a shared region of the image that shares a common area with the third background layer. The method further includes modifying the image to replace a portion image corresponding to the shared region with a portion of the third background layer corresponding to the shared region.

In some embodiments, the method includes ceasing the iterative modifications on the image in response to satisfying one or more criteria. In some embodiments, the one or more criteria include a fidelity level exceeding a threshold fidelity level. The fidelity level is determined based on an area of the combined background layer compared to an area of the image of the obscured region combined with the area of the combined background layer. In some embodiments, the one or more criteria include at least one of exceeding a threshold amount of time or a threshold number of frames of the video stream. In some embodiments, the method includes resuming the iterative modifications on the image in response to detecting movement within the video stream.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 1 illustrates an example system architecture capable of iterative background generation of video streams using a generative machine learning model for image inpainting, in accordance with aspects and implementations of the present disclosure.

FIG. 3 depicts a flow diagram of a method for iterative background generation for video streams, in accordance with aspects and implementations of the present disclosure.

DETAILED DESCRIPTION

Figure 2A:
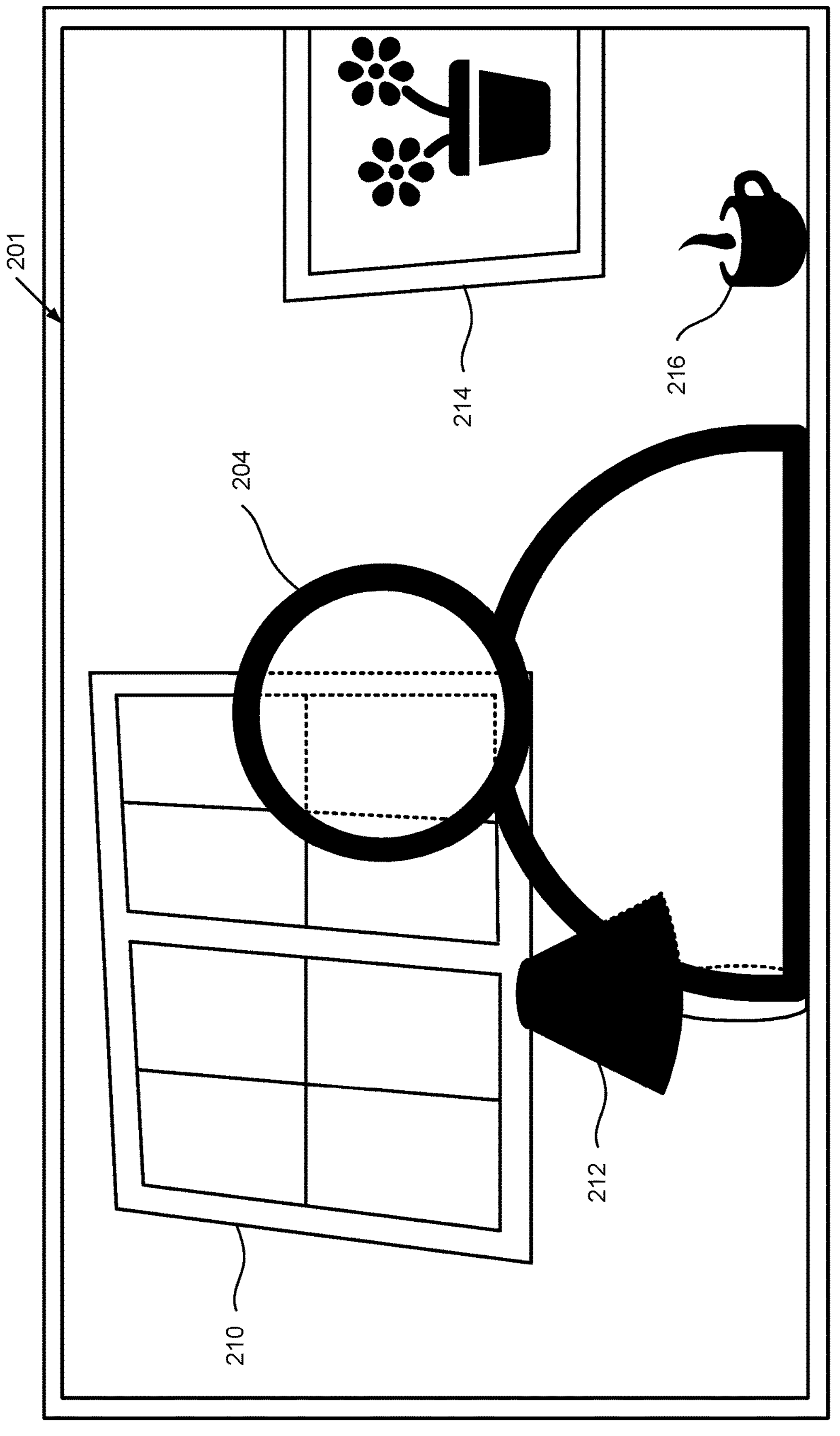
FIG. 2A illustrates an example of a frame of a video stream of a participant of a virtual meeting, in accordance with aspects and implementations of the present disclosure.

Aspects of the present disclosure relate to iterative background generation for video streams. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting. A virtual meeting (e.g., video conference) can refer to a virtual meeting during which a client device connected to the virtual meeting platform captures and transmits image data (e.g., video data collected by a camera of the client device) and/or audio data (e.g., collected by a microphone of the client device) to other client devices connected to the platform. The image data can, in some instances, depict a participant or a group of participants that are participating in the virtual meeting. The audio data can include, in some instances, an audio recording of audio provided by the participant or group of participant during the virtual meeting.

Virtual meetings can facilitate real-time communication and collaboration among geographically diverse participants. With an increasing number of virtual meetings, participants frequently utilize tools provided by virtual meeting platforms for background replacement. Additionally, virtual meeting platforms may perform background replacement to implement various features of the virtual meeting platforms.

Background replacement can refer to a replacement or modification of image data, such as background image data/video data representing a background of a scene, of a video stream received from a client device of a participant with different background image data (e.g., video data or static image) to create a new and/or different background. The image data of the foreground, often representing the participant and received in the video stream from the client device of the participant, can be composited on the new background and the composited video stream having the new background can be transmitted to the client devices of the participants of the video conference for presentation.

Video frames (e.g., frames) of a video stream, and in particular in the context of video frame editing, can be divided into multiple layers, such as a background layer and foreground layer. The foreground layer can include visual content, such as the participant, that appears in front of the other layers. The background layer can include visual content, such as a landscape or a wall, that appear behind other layers. The layers of the video frame can be combined to form a composite video frame.

Conventional virtual meeting platforms can offer features that modify or fully replace the background of a video stream. Such features can utilize a significant amount of computational resources, and in particular processing and memory resources, to modify or create background layers.

In an example, a virtual meeting platform can implement a feature that moves the representation of the participant (e.g., foreground layer) from one position (e.g., center) with respect to the video frames of the video stream to another position (e.g., left side) with respect to the video frames. For instance, the representation of the participant can be cropped from the center of the video frames and moved to the left side of the video frames. The void in the cropped video frames created by the removal of the foreground layer (e.g., representation of the participant) can be filled with a texture, pattern, and/or color that is similar to other elements in background layer. Often, the consistency and cohesiveness of the generated background layer is unsatisfactory. Additionally, the conventional meeting platforms can perform this process for every video frame of the video stream, which can use a large amount of computational resources.

Aspects of the disclosure address the above-mentioned challenges and other challenges by providing systems and techniques that generate a realistic and cohesive background layer by creating a combined background layer that combines visual content of multiple background layers of sequential frames to at least partially fill the void created by the removal of the foreground layer (e.g., the visual representation of the participant). The combined background layer can be stored for further processing and/or be used to replace the original background layer of the participant's video stream.

In some embodiments, to fill any remaining void in the combined background layer a machine learning model, such as a generative machine learning model, can be used to perform image inpainting that generates visual content having similar features (e.g., color, texture, and/or pattern) to elements that surround the void and uses the generated visual content to fill the void. The generative background layer can be composited with the foreground layer to generate a composited video frame(s). A video stream using the composited video frames can be provided to the client devices associated with the virtual meeting for presentation at the respective user interfaces (UIs).

In some embodiments, rather than recreate the combined background layer for every frame of the video stream, the same combined background layer can be used to replace the original background layer for multiple sequential frames of the video stream. Alternatively, the same combined background layer can be used to generate a generative background layer for multiple sequential frames of the video stream.

In some embodiments, the above operations can be iterated to improve the quality (e.g., fidelity) of the combined and/or generative background layer—which can exceed the quality provided by conventional systems and use less computational resources in so doing. Over time when additional frames of the video stream are received from the client device of the participant, the additional frames can contain additional visual content in the area of the void. The additional visual content from the additional frames can be combined with the preceding combined background layer to further fill the void. The new combined background layer can be stored for further processing and/or be used to replace the original background layer of the participant's video stream.

For instance, the location of the representation of the participant in the foreground layer can obscure visual content in a region of the background layer (e.g., obscured region). As the participant moves during a video conference, more visual content in the obscured region is revealed in subsequent video frames of the video stream. Visual content from the obscured region of different video frames can be merged to generate a combined background layer. For the remaining obscured region, new visual content for the combined background layer can be generated using a generative machine learning model that performs an inpainting operation. The generative background layer can be used to replace the original background layer for many sequential video frames of the video stream—which is transmitted to the client devices of the virtual meeting for presentation. Overtime additional visual content from the obscured region and obtained from new video frames can be merged with the previous combined background layer to generate a new combined background layer having a smaller obscured region and greater fidelity. New visual content for the new combined background layer can be generated using the inpainting operation. The above operations can be iterated overtime to generate a more realistic and cohesive background layer.

In some embodiments, the virtual meeting platform can iteratively modify the background layer to a predetermined threshold fidelity level (e.g., 95 percent (%) fidelity level). A fidelity level can refer to a measure of visual content of a combined background layer that is merged together from multiple background layers and can reflect the degree to which the background layer reproduces the real-world background. For example, over time, the virtual meeting platform can obtain the entirety of the visual content of the background layer such that no portion of the background layer is generated via a machine learning model, which can correspond to 100 percent fidelity level.

In some embodiments, the virtual meeting platform can perform the iterative modification of the background layer until one or more criteria are satisfied. For example, the one or more criteria can include a threshold fidelity level. In an illustrative example, the threshold fidelity level can be a 90% fidelity level, indicating that the threshold is exceeded when greater than 90% of the background image is not generated by a machine learning model (e.g., 90% of the visual content of the combined background layer is from merged background layers). In some embodiments, the one or more criteria can include a threshold number of frames processed. For example, the virtual meeting platform can process up to but not exceed 300 frames the video stream to create the background layer. In some embodiments, the one or more criteria can include a threshold amount of time. For example, the virtual meeting platform can process up to but not exceed the first ten seconds of the video stream to create the background layer. In some embodiments, that virtual meeting platform can cease iterative modification of the background layer in response to satisfying the one or more threshold criteria. In some embodiments, subsequent to ceasing the iterative modification, the virtual meeting platform can resume iterative modification for the background layer in response to detecting a threshold amount of movement within the video stream.

Aspects of the present disclosure provide technical advantages over previous solutions. The advantages of the disclosed technique can provide additional functionality to a virtual meeting platform by iteratively modifying the background layer by merging visual content of multiple background layers to form a combined background layer, and generating additional visual content for an obscured region of the combined background layer using a machine learning model. The disclosed techniques, which can result in more efficient use of computational resources, such as processing resources and memory resources, and reduce network latency by performing the iterative modification to the background layer asynchronously, rather than each frame of a video stream.

FIG. 1 illustrates an example system architecture 100 capable of iterative background generation of video streams using a generative machine learning model for image inpainting, in accordance with aspects and implementations of the present disclosure. The system architecture 100 (also referred to as "system" herein) includes client devices 102A-N, one or more client devices 104, a data store 110, a platform 120, and a server 130, each connected to a network 108.

In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, and so forth, that can be hosted by platform 120 or one or more different machines (e.g., the server 130) coupled to the platform 120 via network 108. In some implementations, the data store 110 can store portions of audio and video streams received from the client devices 102A-102N for the platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

In some implementations, the data store 110 can store background images(s) 112 of video streams received from client devices 102A-102N. Background images(s) 112 can generally refer to an underlying scene or images that are static and serve as a backdrop for a video stream. In some embodiments, background image(s) 112 can be iteratively generated according to aspects and implementations of the technique described herein. In some embodiments, background image(s) 112 can be generated and stored in association with a user (e.g., via a user identifier) of the platform 120. For example, a video stream can include a rendering of the participant's background that displays the participant's surroundings such as visual background elements the compose the background layer 112. In some embodiments, the background layer(s) 112 can be separated from a corresponding foreground layer of a video stream and stored in the data store 110. In some embodiments, the background layer(s) can be a virtual background where a foreground layer of a video stream is to be overlaid or composited on top of the virtual background. A foreground layer can represent moving elements that appear on top of a background layer in a video stream. For example, a foreground layer can include a rendering of a participant of a virtual meeting.

In some embodiments, platform 120 can enable users of client devices 102A-102N and/or client device(s) 104 to connect with each other via a virtual meeting (e.g., a virtual meeting 121). A virtual meeting refers to a real-time communication session such as a virtual meeting call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Platform 120 can allow a user to join and participate in a virtual meeting call with other users of the platform. Embodiments of the present disclosure can be implemented with any number of participants connecting via the virtual meeting (e.g., five hundred or more).

The client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices 102A-102N." Each client device 102A-102N can include an audiovisual component that can generate audio and video data to be streamed to platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, platform 120 is coupled, via network 108, with one or more client devices 104 that are each associated with a physical conference or meeting room. Client device(s) 104 can include or be coupled to a media system 132 that can include one or more display devices 136, one or more speakers 142 and one or more cameras 144. Display device 136 can be, for example, a smart display or a non-smart display (e.g., a display that is not itself configured to connect to network 108). Users that are physically present in the room can use media system 132 rather than their own devices (e.g., client devices 102A-102N) to participate in a virtual meeting, which can include other remote users. For example, the users in the room that participate in the virtual meeting can control the display device 136 to show a slide presentation or watch slide presentations of other participants. Sound and/or camera control can similarly be performed. Similar to client devices 102A-102N, client device(s) 104 can generate audio and video data to be streamed to platform 120 (e.g., using one or more microphones, speakers 142 and cameras 144).

Each client device 102A-102N or client device(s) 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access platform 120. For example, a user of client device 102A can join and participate in a virtual meeting via a UI 124A presented on the display device 103A by the web browser or client application. A user can also present a document to participants of the virtual meeting via each of the UIs 124A-124N. Each of the UIs 124A-124N can include multiple regions to present video streams corresponding to video streams of the client devices 102A-102N provided to the server 130 for the virtual meeting.

In some implementations, the system 100 can include a virtual meeting manager (not illustrated). The virtual meeting manager can be included in at least one of the sever machines 130-150, platform 120, or client devices 102A-N. The virtual meeting manager can be configured to manage a virtual meeting between multiple users of platform 120. In some implementations, the virtual meeting manager can provide the UIs 124A-124N to each client device to enable users to watch and listen to each other during a virtual meeting. The virtual meeting manager can also collect and provide data associated with the virtual meeting to each participant of the virtual meeting. In some implementations, the virtual meeting manager can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device(s) 104. The native application can be separate from a web browser. In some embodiments, the virtual meeting manager can determine video streams for presentation in the UI 124A-124N during a virtual meeting. Such a video stream can depict, for example, a user of the respective client device while the user is participating in the virtual meeting (e.g., speaking, presenting, listening to other participants, watching other participants, etc., at particular moments during the virtual meeting), a physical conference or meeting room (e.g., with one or more participants present), a document or media content (e.g., video content, one or more images, etc.) being presented during the virtual meeting, and the like.

As described previously, an audiovisual component of each client device can capture images and generate video data (e.g., a video stream) of the captured data of the captured images. In some implementations, the client devices 102A-102N and/or client device(s) 104 can transmit the generated video stream to virtual meeting manager. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to virtual meeting manager.

Training data generator 131 (e.g., residing at server machine 130) can generate training data to be used to train machine learning models 160A-N. Models 160A-N can include machine learning models used or otherwise accessible to image generator 151. In some embodiments, training data generator 131 can generate the training data based on video frames of training videos and/or training images (e.g., stored at data store 110 or another data store connected to system 100 via network 108) and/or data associated with one or more client devices that accessed the training media items.

Server machine 140 can include a training engine 141. Training engine 141 can train machine learning models 160A-N using the training data from training data generator 131. In some embodiments, the machine learning models 160A-N can refer to model artifacts created by the training engine 141 using the training data that includes training inputs and corresponding target outputs (correct answers for respective training inputs). The training engine 141 can find patterns in the training data that map the training input to the target output (the answer to be predicted), and provide the machine learning models 160A-N that captures these patterns. The machine learning models 160A-N can be composed of, e.g., a single level of linear or non-linear operations (e.g., a Convolutional Neural Network (CNN), a Generative Adversarial Network (GAN), or other deep network, e.g., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning models 160A-N can refer to model artifacts that are created by training engine 141 using training data that includes training inputs. Training engine 141 can find patterns in the training data, identify clusters of data that correspond to the identified patterns, and provide the machine learning models 160A-N that captures these patterns. Machine learning models 160A-N can use one or more of clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, machine learning models 160A-N can include a machine learning model 160A that is trained to predict, based on a given image or frame, such as a frame of a video stream, background pixels and foreground pixels for the given frame based on learned patterns and features. In some embodiments, the machine learning model 160A can be trained to predict segmentation masks. For example, the machine learning model 160A can be an image/frame segmentation model trained to predict segmentation masks that outline one or more regions corresponding to foreground objects in the image/frame. Segmentation masks indicate labels of pixels in an image/frame, the labels represent a region (e.g., a background region, a foreground region, etc.) to which the pixels correspond to. For example, the predicted segmentation mask can be represented as a two-dimensional data structure (e.g., an array) in which each element of the data structure corresponds to a pixel of a given frame. The value of each element of the data structure indicates class assigned to the respective pixel. For example, a value of 0 can indicate a background pixel and a value of 1 can indicate a foreground pixel.

In some embodiments, machine learning models 160A-N can include a generative machine learning model 160B that is trained to perform, based on a given image or frame (e.g., background image(s) 112), an inpainting of a missing or obscured region of the given image or frame. In the field of computer vision techniques, performing an inpainting can be the process of generating missing portions of an image in a visually plausible manner in the context of surrounding regions of the image. Using contextual information of the surrounding regions of the image, the machine learning model 160B can generate a complete image by performing an inpainting over the missing regions.

Server machine 150 can include image generator 151. Image generator 151 can dynamically (e.g., for each frame of a video stream) combine background layers of respective frames of a video stream to generate background images 112. For example, the video stream can be a video stream from a client device 102A of a participant of a virtual meeting 121. Image generator 151 can extract background layers from frames of the video stream and combine the background layers to obtain the background image 112. The background image 112 can nonetheless include a region obscured by respective foreground layers (e.g., renderings of the participant) of the frames. In some embodiments, the image generator 151 can leverage a generative machine learning model (e.g., machine learning model 160B) to perform an inpainting of the obscured region.

In some embodiments, image generator 151 can leverage a segmentation machine learning model (e.g., machine learning model 160A) to determine background and foreground layers of frames of the video stream. The foreground layer can include a rendering of the first participant while the background layer can include a rendering of the first participant's surroundings. Image generator 151 can provide frames of the video stream as input to the segmentation machine learning model (e.g., machine learning model 160A) and obtain, as output, the background and foreground regions that respectively compose the background and foreground layers.

It should be noted that although FIG. 1 illustrates image generator 151 as part of platform 120, in additional or alternative embodiments, image generator 151 can reside on one or more server machines that are remote from platform 120 (e.g., server machine 150, server machine 160). It should be noted that in some other implementations, the functions of server machines 130, 140, 150, and/or platform 120 can be provided by a fewer number of machines. For example, in some implementations, components and/or modules of any of server machines 130, 140, and 150 can be integrated into a single machine, while in other implementations components and/or modules of any of server machines 130, 140, and 150 can be integrated into multiple machines. In addition, in some implementations, components and/or modules of any of server machines 130, 140, and 150 can be integrated into platform 120. In general, functions described in implementations as being performed by platform 120 and/or any of server machines 130, 140, and 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of virtual meeting platform 120 and users of virtual meeting platform 120 participating in a virtual meeting, implementations can also be generally applied to any type of telephone call or conference call between users. Additionally, implementations of the disclosure are not limited to virtual meeting platforms that provide virtual meeting tools to users. For example, aspects and embodiments of the present disclosure can be applied to content sharing platforms that allow users to generate, share, view, and otherwise consume media items such as video streams and other video items. In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

FIG. 2A illustrates an example user interface (UI) 200 for a virtual meeting, in accordance with some embodiments of the present disclosure. The UI 200 can be generated by one or more processing devices of the one or more server machines 130, 140, and 150 of FIG. 1. In some embodiments, the UI 200 can be generated for presentation at a client device (e.g., client devices 102A-102N and/or 104). In some implementations, the virtual meeting between multiple participants can be managed by a virtual meeting platform, such as platform 120 of FIG. 1. The platform 120 can provide the UI 200 to enable participants to join and participate in the virtual meeting.

UI 200 can include a region to display one or more video streams corresponding to video data captured and/or streamed by client devices, such as client devices 102A-102N of FIG. 1, associated with participants of the virtual meeting. In some embodiments, the UI 200 can display a video stream of one participant of the virtual meeting. In an illustrative example, the UI 200 can include a single region to display a video stream corresponding to the video data captured and/or stream by a client device associated with participant 204 of the virtual meeting. The illustrated single-region layout of the UI 200 focuses on the video stream of participant 204 while temporarily hiding video streams of other participants of the virtual meeting. The illustrated single-region layout of the UI 200 is used by way of example, and not by way of limitation, noting that other layouts of UI 200 are considered herein. For example, the UI 200 can include multiple regions that each display a video stream corresponding to video data capture and/or streamed by client devices associated with multiple participants of the virtual meeting. The video streams of the multiple participants can be arranged in a grid pattern within the UI 200 where each participant's video stream is displayed in a separate rectangular region. In another example, the video stream of a participant that is actively speaking can be displayed prominently within the UI 200, while video streams of other participants can be displayed within the UI 200 in smaller regions (e.g., "thumbnail" regions). In some embodiments, the platform can associate each region with a video stream received from a client device. In some embodiments, this can be done automatically without any user input specifying which video stream(s) are to be displayed within the UI 200.

In some implementations, the UI 200 can also include an options region (not illustrated in FIG. 2) for providing selectable options to adjust display settings (e.g., a size of each region, a number of regions, a selection of a video stream, etc.), invite additional users to participate, etc. In some implementations, the UI 200 can include a UI element (e.g., an icon) (not illustrated in FIG. 2) that corresponds to a self-view indicator, which can indicate to a participant if the participant's video stream is displayed in a region in the UI.

In some embodiments, a user (e.g., a participant of the virtual meeting) can interact with the UI 200 to cause a modification of a size or a position of video stream(s) displayed within the UI 200. For example, the user can use an input device (e.g., a keyboard, a touch screen etc.) or a cursor device (e.g., a mouse) associated with the client device to cause a modification of the size or the position of the video streams displayed within the UI 200. In some embodiments, the participant can cause a modification of the position to a location outside of the UI 200. For example, in response to a user interaction (e.g., via a cursor, a touch screen etc.), the video stream of participant 204 can be detached from the UI 200 and moved to another display device. Users can cause various modifications of video streams. For example, video streams can be resized, moved, zoomed in, cropped, transferred to another display device (e.g., another monitor), or otherwise adjusted to provide a preferred viewing environment. In another example, users can apply filters (e.g., sharpening filters, stylization filters, etc.), add contrast adjustments, or otherwise alter visual aesthetics of video streams according to a user's personal preference.

The video stream displayed within the UI 200 can include a live video stream of the participant 204 connected to the virtual meeting. The video stream can be a live rendering of participant 204 including their facial features, body, and movements. Specifically, FIG. 2A illustrates a frame 201 of a video stream displayed within the UI 200. The frame 201 includes a rendering of the participant 204 at a certain position within the frame 201. The frame 201 includes a rendering of the participant's background surroundings such as visual background elements. In the illustrated example, the visual background elements include a window 210, a lamp 212, a picture frame 214, and a coffee cup 216.

In certain frames of the video stream, the rendering of the participant 204 can partially or completely obscure one or more background elements. For example, in the frame 201, the participant 204 is positioned to partially obscure the window 210 and the lamp 212 such that other participants viewing the video stream can only partially see the window 210 and the lamp 212.

In some embodiments, a processing device, such as the image generator 151 of FIG. 1, can cause the frame 201 video stream to be separated into a background layer and foreground layer. The foreground layer can include a rendering of the participant 204 and objects in close proximity (e.g., within 2 feet) to the capture device. The background layer can include visual elements or scenery behind the participant 204, such as the participant's surroundings. For example, the background layer can include the window 210, the lamp 212, the picture frame 214, and the coffee cup 216.

In some embodiments, to separate the background and foreground layers of the frame 201, the processing device can segment the video stream using various computer vision techniques. Segmentation refers to the process of dividing an image into multiple regions or segments. For example, the video stream can be segmented into multiple background regions that, when combined, form the background layer; and into multiple foreground regions that, when combined, form the foreground layer. In some embodiments, the video stream can be segmented using a segmentation machine learning model that is trained to predict, based on a given image or frame, such as the frame 201, background regions and foreground regions based on learned patterns and features. The segmentation machine learning model can be trained on historical data such as frames/images and labeled data indicating which regions (e.g., pixels) belong to a background region and which regions belong to a foreground region. Training data (historical data) can be labeled using ground truth data indicating which regions are part of the foreground and which regions are part of the background. The ground truth data can be established by human observers or through an automated tool. After training and deployment, the segmentation machine learning model can process the frame 201 of the video stream and predict background and/or foreground regions of the frame 201 based on learned patterns from the training data. The segmentation model can provide one or more foreground and background regions as output to the processing device.

In some embodiments, the processing device can combine the predict foreground regions obtain as output from the segmentation model to obtain the foreground layer and combine the predict background regions obtained as output form the segmentation model to obtain the background layer. In some embodiments, the obtained background layer can be stored within a data store (e.g., data store 110) as a background image for further processing using subsequent frames of the video stream. The processing device can use the segmentation model to dynamically (e.g., for each frame of the video stream) update background and foreground layers to separate the foreground layer rendering the participant 204 from the background layer as the participant 204 exhibits movement at subsequent frames of the video stream.

Figure 2B:
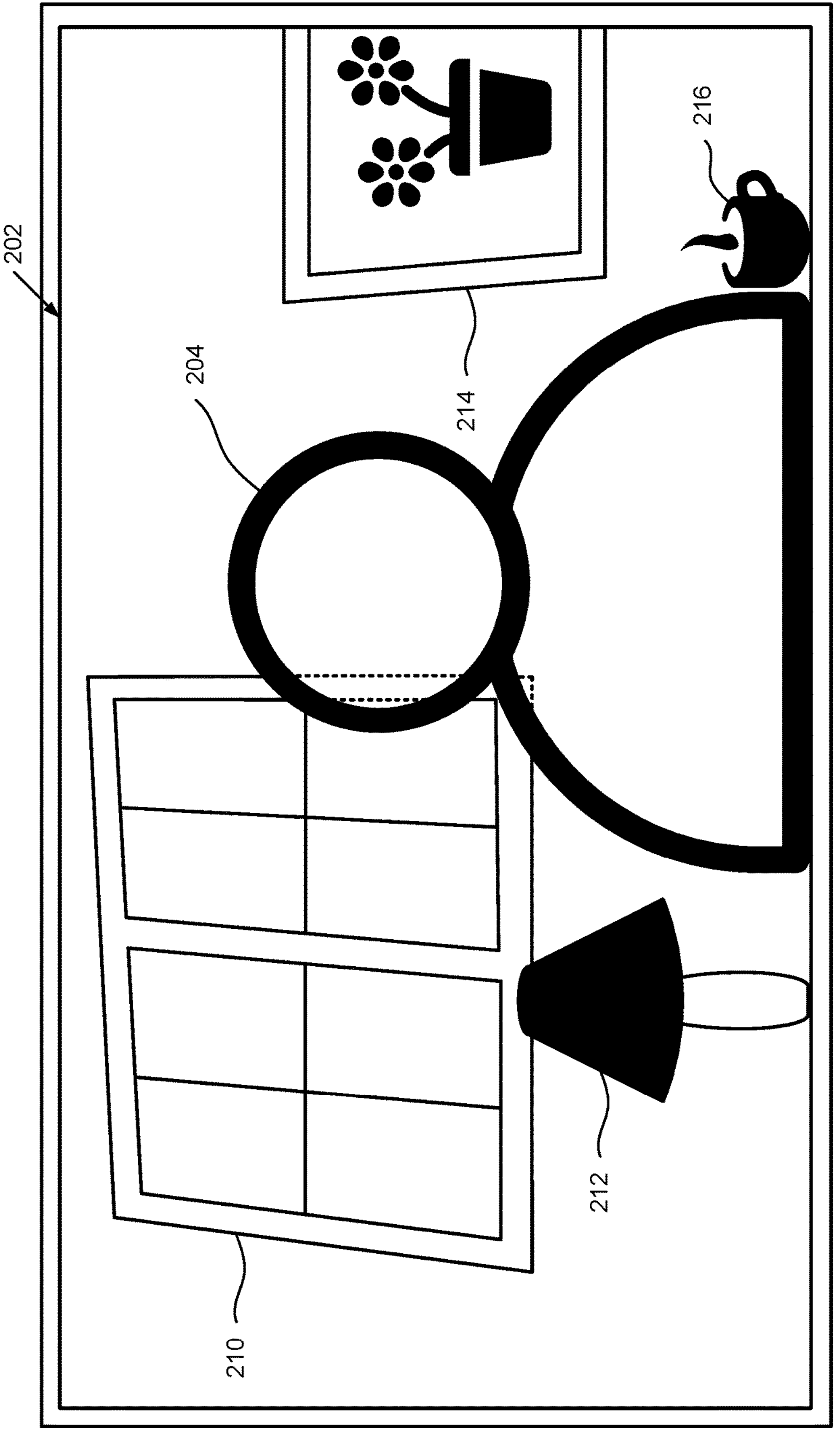
FIG. 2B illustrates another example of a frame of a video stream of a participant of a virtual meeting, in accordance with aspects and implementations of the present disclosure.

FIG. 2B illustrates another example user UI 200 for a virtual meeting, in accordance with aspects and implementations of the present disclosure. Specifically, FIG. 2B illustrates another frame 202 of a video stream displayed within the UI 200. In some embodiments, the frame 202 is a frame subsequent to the frame 201 of FIG. 2A in the same video stream. For example, the frame 201 can be a first frame of a video stream, and the frame 202 can be a second frame of the video stream. The frame 202 is similar to the frame 201 of FIG. 2A, but the participant is positioned further to the right within the frame. As illustrated between the frame 201 and the frame 202, the participant 204 has adjusted their position within the frame further to the right. As such, the lamp 212 is now fully visible to a viewer of the video stream at frame 202. The window 210 is still partially obscured by the participant 204, but the region of the window 210 obscured (as indicated by the dotted lines) by the participant 204 in the frame 202 is smaller compared to the portion of the window 210 obscured by the participant 204 in the frame 201. Accordingly, the background can be increasingly revealed throughout subsequent frames of the video stream as the participant 204 exhibits movement.

A processing device, such as image generator 151 of FIG. 2, can use a segmentation machine learning model to segment the frame 202 into a background layer and a foreground layer in a same or similar manner as described above with respect to segmentation of frame 201. Once the frame 201 and frame 202 have been segmented and respective background layers have been extracted, the processing device can combine the background layer of frame 201 with the background layer of frame 202 to produce a combined background layer. In some embodiments, the processing device can use existing image stitching techniques to process overlapping portions of the background layer of frames 201 and 202 to produce a combined background layer. In some embodiments, the combined background layer can be stored (e.g., in data store 110) for further processing.

Figure 2C:
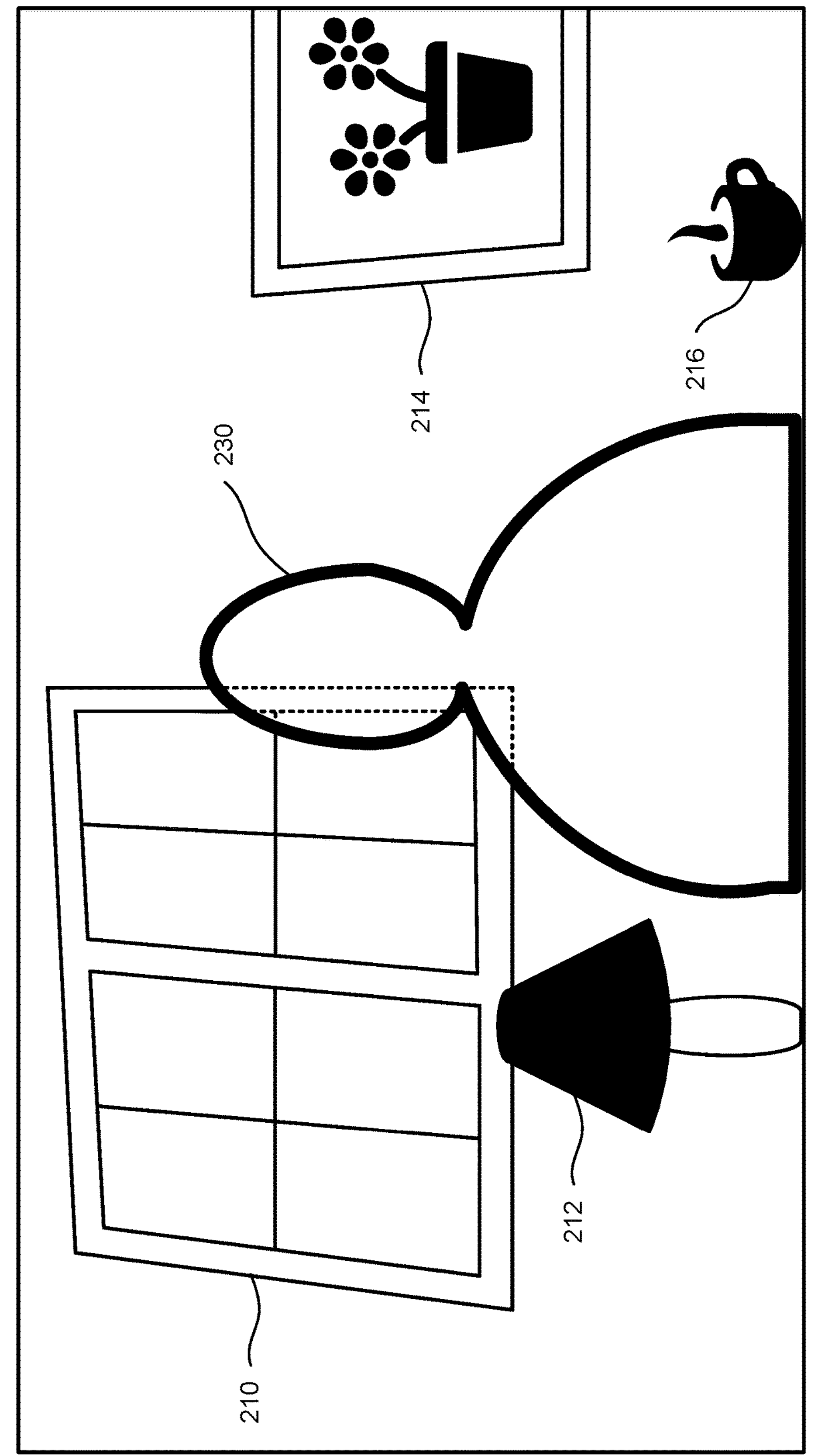
FIG. 2C illustrates an example of combined background layers of a video stream, in accordance with aspects and implementations of the present disclosure.

FIG. 2C illustrates an example of a combined background layer 220 of a video stream, in accordance with aspects and implementations of the present disclosure. Specifically, FIG. 2B illustrates a combined background layer 220 produced by combining the background layer of the frame 201 of FIG. 2A with the background layer of the frame 202 of FIG. 2B. The combined background layer 220 includes a region 230 (also referred to as the "obscured region" herein) that is obscured by the foreground layer rendering the participant 204 in both the frame 201 and the frame 202 of the video stream. As illustrated by the dotted lines within the obscured region 230, the window 210 is partially obscured in the combined background layer 220. In some embodiments, the processing device can produce an inpainting of the obscured region 230 using a generative machine learning model for image inpainting to obtain a complete background image.

A generative image inpainting model can use various deep learning techniques (e.g., GANs, CNNs, and other deep learning networks) to fill in missing or obscured regions of an image to create a whole image that is visually plausible to a human observer. The generative image inpainting can be trained using a dataset of historical images where one or more portions of the historical images are removed (also referred to as "masking" herein) to simulate an image inpainting task. The masking of the historical images can be performed manually with human intervention or with an automatic tool. The unaltered historical images can serve as ground truth images while the same historical images with the one or more portions of the image removed can serve as pairs to the ground truth images. In some embodiments, the generative image inpainting model can leverage adversarial training using a discriminator to train the model. The discrimination is another model trained to differentiate between real images and generated and inpainted images. The generative image inpainting model can learn to produce realistic images by attempting to generate images that discriminator identifies as real images.

After training and deployment, the generative image inpainting model can process frames of the of the video stream to perform an inpainting of obscured regions of the frames. For example, the processing device can provide the combined background layer 220 as input to the generative image inpainting model. The generative image inpainting model can perform an inpainting of the obscure region 230 of the combined background layer 220, as illustrated below with respect to FIG. 2D.

Figure 2D:
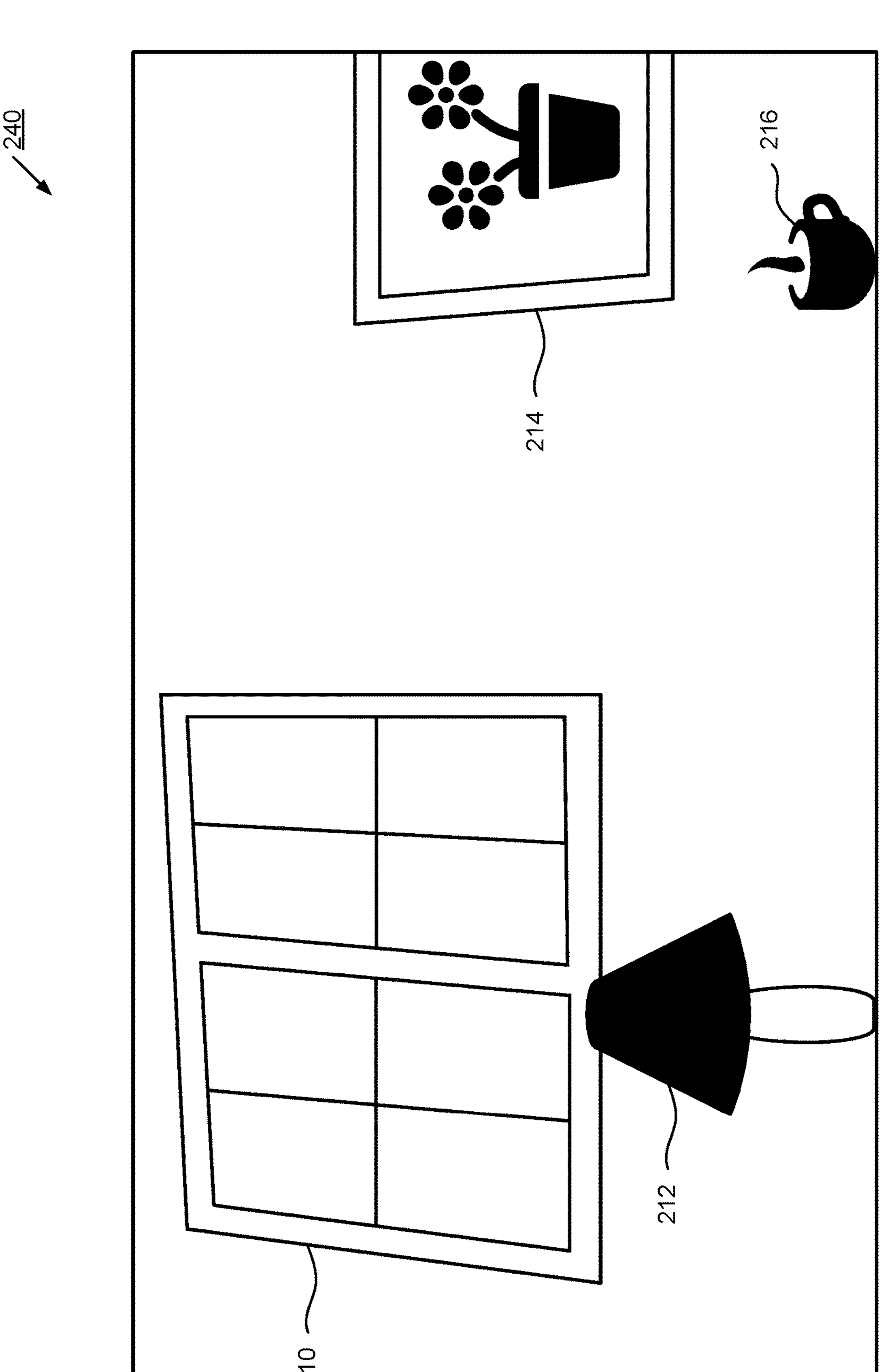
FIG. 2D illustrates an example of a background image with an inpainting of an obscured region, in accordance with aspects and implementations of the present disclosure.

FIG. 2D illustrates an example of a background image 240 with an inpainting of an obscured region, in accordance with aspects and implementations of the present disclosure. In some embodiments, the processing device can utilize the background image 240 for background replacement of the video stream. For example, the processing device can replace background layers of subsequent frames of the of the video stream with the background image. In some embodiments, the processing device can perform background replacement by compositing the foreground layer of the video stream rendering the participant 204 on top of the background image 240. The video stream with the background layer replaced with a static background image 240 can be presented to other participants of the virtual meeting. Background replacement with a static image can result in a more efficient use of processing resources for performing other operations on the background of the video stream. For example, the participant can cause a blur effect to be applied to their background. this technique can enable the virtual meeting platform 120 to apply the blur effect only once to the background image 240 rather than apply the blur effect to each frame of the video stream.

In some embodiments, the background image 240 can be stored (e.g., in data store 110) for additional processing at subsequent frames of the video item. In some embodiments, background image can be stored in association with a user identifier of the participant to enable the participant to access and use the background image 240 for background replacement at a future virtual meeting.

In some embodiments, the processing device can perform iterative modifications on the background image 240 as portions of an obscured region (e.g., the obscured region 230 of FIG. 2C) are revealed. For example, the rendering of a participant (e.g., participant 204 of FIG. 2A-B) can exhibit movement throughout the video stream, causing an increasing portion of the obscured region 230 to be revealed and known to the processing device. For example, at a subsequent frame of the video stream, a background layer of the subsequent frame can overlap with the obscured region 230. The processing device can modify the background image 240 to replace the portion of the obscured region 230 that overlaps with the background layer of the subsequent frame with the overlapping portion of the background layer. The processing device can further modify the background image 240 by causing the generative image inpainting model to perform an inpainting of the remaining portion of the obscured region 230. Such iterative modification can converge in fidelity over time as the background image 240 approaches the actual background surroundings of the participant 204. In some embodiments, this process can recover the entirety of the actual background surroundings as the background image 240 is continually modified to include revealed information. Over time, resources used to for image inpainting can decrease as the generative image inpainting model generates a decreasing portion of the obscured region 230.

In some embodiments, the processing device can continue interactive modifications of the background image 240 until one or more criteria are satisfied. For example, the one or more criteria can include a threshold fidelity level. A fidelity level can indicate an amount of the background image 240 that is certain (e.g., not generated). For example, a 95% fidelity level can indicate that 95% of the pixels of background image 240 are associated with actual background surroundings and 5% of the pixels are pixels generated by the image inpainting model. In an illustrative example, the processing device can continue iterative modification of the background image 240 until a threshold fidelity level of 95% is exceeded.

In some embodiments, the processing device can continue performing iterative modification of the background image 240 until the fidelity level of the background image 240 converges on and maintains a certain fidelity level for a pre-determined number of frames. For example, the fidelity level of the background image 240 can converge on a 70% fidelity level and remain at the 70% fidelity level for 150 frames of the video stream. After the background image 240 remains around (e.g. within 1%) of the 70% fidelity level for 150 frames, the processing device can cease iterative modification of the background image 240. In some embodiments, the processing device can cease iterative modification in response to the fidelity level remaining at a certain fidelity level for a number of frames even if the target the fidelity level is not achieved. The above-described criterion can be considered a rate of fidelity level improvement. As the rate of fidelity level improvement approaches a value close zero, the processing device can cease the iterative modification process.

In some embodiments, the one or more criteria can include a frame constraint or a time constraint. For example, the processing device can be constrained to perform iterative modification on the background image 240 for 900 frames (equivalent to 30 seconds and 30 FPS) before ceasing iterative modification. This can enable the processing device to run the interactive modification operations for a fixed number of frames or a fixed amount of time. In some embodiments, a developer and/or an operation associated with the platform 120 can provide (e.g., via a client device) an indication of the frame and/or time constraint.

In some embodiments, after ceasing the iterative modification process in response to satisfying one or more criteria, the processing device can resume or re-trigger the iterative modification process based on motion detection. For example, in response to detecting motion (e.g., the participant 204 shifting their sitting, standing up, etc.) within a foreground layer of the video stream, the processing device can resume iterative modification operations as additional background surroundings may have been revealed as a result of the movement.

In some embodiments, the above-described iterative modification process can be implement based on stationary devices (e.g., a laptop, a web camera, etc.) capturing the participant's 204 video stream. In some embodiments, the iterative modification process can be implement based on non-stationary devices such as a mobile device. In the case of non-stationary devices, the processing device can perform image stitching on the analyzed frames to ensure the background image 240 is uniform and accurate. For example, a participant of a virtual meeting using a mobile device can exhibit some minor motion that causes the field of view of the camera on the mobile device to subtly shift throughout the course virtual meeting. Accordingly, the processing device can perform image stitching using the analyzed frames (e.g., frame 201, frame 202, etc.) to create the background image 240. Image stitching is the process of combining multiple overlapping images or frames into a single image. To perform image stitching, the processing device can identify key features (e.g., edges, distinctive points, etc.) to act as reference points for aligning the frames. The processing device can match the identified features between the frames. These frames can be applied on top of each other such that the identified features align to produce a homogeneous background image 240.

FIG. 3 depicts a flow diagram of a method 300 for iterative background generation for video streams, in accordance with aspects and implementations of the present disclosure. Method 300 can be performed by processing logic that can include hardware (circuitry, dedicated logic, etc.), software (e.g., instructions run on a processing device), firmware, and/or a combination thereof. In one implementation, some or all the operations of method 300 can be performed by one or more components of system 100 of FIG. 1 (e.g., platform 120, servers 130-150, and/or image generator 151).

For simplicity of explanation, the method 300 of this disclosure is depicted and described as a series of acts. However, acts in accordance with this disclosure can occur in various orders and/or concurrently, and with other acts not presented and described herein. Furthermore, not all illustrated acts can be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 302, processing logic can determine a first background layer and a first foreground layer of a first frame of video stream provided by a client device associated with a participant of multiple participants of a video conference. In some embodiments, to determine the first background layer and the first foreground layer, the processing logic can provide the first frame of the video stream as input to a machine learning model. The machine learning model is trained to predict, based on a given frame, segmentation labels for the given frame that represent foreground and background regions of the given frame. The processing logic can obtain outputs from the machine learning model. The outputs include one or more background regions and one or more foreground regions. The processing logic can combine the one or more background regions to obtain the first background layer. The processing logic can combine the one or more foreground regions to obtain the first foreground layer.

At operation 304, the processing logic can determine a second background layer and a second foreground layer of a second frame of the video stream.

At operation 306, the processing logic can combine the first background layer and the second background layer to obtain combined background layer. The combined background layer includes a region obscured by both the first foreground layer and the second foreground layer.

At operation 308, the processing logic can perform, using a generative machine learning model, an inpainting of the obscured region to obtain an image of the obscured region.

At operation 310, the processing logic can modify, using the image of the obscured region and the combined background layer, background layers of subsequent frames of the video stream.

At operation 312, the processing logic can provide the video stream with modified background layers for presentation on one or more client devices of one or more of the multiple participants of the video conference.

In some embodiments, the processing logic can further perform iterative modifications on the image for subsequent frames of the video stream as portions of the obscured region are revealed. In some embodiments, to perform iterative modifications on the image for subsequent frames of the video stream as portions of the obscured region are revealed, the processing logic can determine a third background layer of the of a third frame of the video stream. The processing logic can determine a shared region of the image that shares a common area with the third background layer. The processing logic can modify the image to replace a portion image corresponding to the shared region with a portion of the third background layer corresponding to the shared region.

In some embodiments, the processing logic can cease the iterative modifications on the image in response to satisfying one or more criteria. In some embodiments, the one or more criteria include a fidelity level exceeding a threshold fidelity level. The fidelity level is determined based on an area of the combined background layer compared to an area of the image of the obscured region combined with the area of the combined background layer. In some embodiments, the one or more criteria include at least one of exceeding a threshold amount of time or a threshold number of frames of the video stream. In some embodiments, the processing logic can resume the iterative modifications on the image in response to detecting movement within the video stream.

Figure 4:
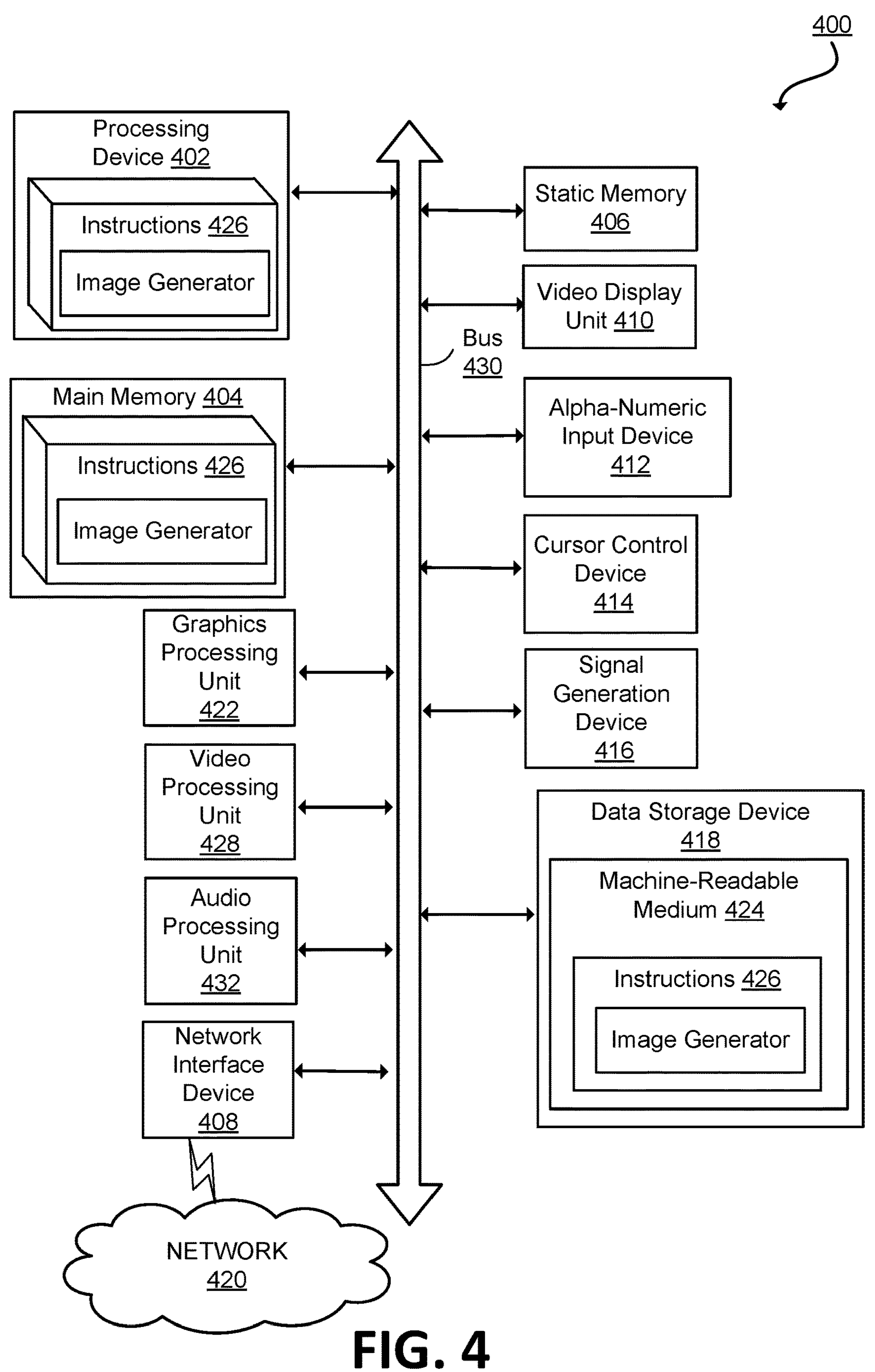
FIG. 4 illustrates an example machine of a computer system within which a set of instructions, for causing the machine to perform any one or more of the methodologies discussed herein, can be executed, in accordance with aspects and implementations of the present disclosure.

FIG. 4 illustrates an example machine of a computer system 400 within which a set of instructions, for causing the machine to perform any one or more of the methodologies discussed herein, can be executed, in accordance with aspects and implementations of the present disclosure. The computer system 400 can be server machines 130-150 or client devices 102A-N of FIG. 1. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random-access memory (DRAM) such as synchronous DRAM (SDRAM), a static memory 406 (e.g., flash memory, static random-access memory (SRAM), etc.), and a data storage device 418, which communicate with each other via a bus 430.

Processing device 402 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 can be configured to execute instructions 426 for performing the operations and steps described herein.

The computer system 400 can further include a network interface device 408 to communicate over the network 420. The computer system 400 also can include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 can include a machine-readable storage medium 424 (also known as a non-transitory computer readable storage medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interact between several components and/or blocks. It can be appreciated that such systems, engines, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words “example” or “exemplary” are used herein to mean serving as an example, instance, or illustration. Any aspect or design described herein as “exemplary” is not necessarily to be construed as preferred or advantageous over other aspects or designs. Rather, use of the words “example” or “exemplary” is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 300 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

determining a first background layer and a first foreground layer of a first frame of a video stream provided by a client device associated with a first participant of a plurality of participants of a video conference;

determining, during the video conference, a second background layer and a second foreground layer of a second frame of the video stream;

combining, during the video conference, the first background layer and the second background layer to obtain a combined background layer, wherein the combined background layer comprises a region obscured by both the first foreground layer and the second foreground layer;

performing, during the video conference and using a generative machine learning model, inpainting of the obscured region to obtain an image of the obscured region;

modifying, during the video conference and using the image of the obscured region and the combined background layer, background layers of subsequent frames of the video stream;

performing iterative modifications on the image for subsequent frames of the video stream as portions of the obscured region are revealed, wherein the iterative modifications are performed until a fidelity level of the combined background layer satisfies a fidelity level criterion, wherein the fidelity level is based on an area of the combined background layer compared to an area of the image of the obscured region combined with the area of the combined background layer; and providing, during the video conference, the video stream with modified background layers for presentation on one or more client devices of one or more of the plurality of participants of the video conference.

2. The method of claim 1, wherein determining, during the video conference, the first background layer and the first foreground layer of the video stream comprises:

providing the first frame of the video stream as input to a machine learning model, wherein the machine learning model is trained to predict, based on a given frame, segmentation labels for the given frame that represent foreground and background regions of the given frame;

obtaining a plurality of outputs from the machine learning model, wherein the plurality of outputs comprises one or more background regions and one or more foreground regions;

combining the one or more background regions to obtain the first background layer; and combining the one or more foreground regions to obtain the first foreground layer.

3. The method of claim 1, wherein performing iterative modifications on the image for subsequent frames of the video stream as portions of the obscured region are revealed comprises:

determining a third background layer of a third frame of the video stream;

determining a shared region of the image that shares a common area with the third background layer; and modifying the image to replace a portion of the image corresponding to the shared region with a portion of the third background layer corresponding to the shared region.

4. The method of claim 3, further comprising ceasing the iterative modifications on the image in response to satisfying one or more criteria.

5. The method of claim 4, wherein the one or more criteria comprise the fidelity level criterion that is satisfied when the fidelity level exceeds a threshold fidelity level.

6. The method of claim 4, wherein the one or more criteria comprise at least one of exceeding a threshold amount of time or a threshold number of frames of the video stream.

7. The method of claim 4, further comprising resuming the iterative modifications on the image in response to detecting movement within the video stream.

8. A system comprising:

a memory device; and a processing device coupled to the memory device, the processing device to perform operations comprising:

determining a first background layer and a first foreground layer of a first frame of a video stream provided by a client device associated with a participant of a plurality of participants of a video conference;

determining, during the video conference, a second background layer and a second foreground layer of a second frame of the video stream;

combining, during the video conference, the first background layer and the second background layer to obtain a combined background layer, wherein the combined background layer comprises a region obscured by both the first foreground layer and the second foreground layer;

performing, during the video conference and using a generative machine learning model, inpainting of the obscured region to obtain an image of the obscured region;

modifying, during the video conference and using the image of the obscured region and the combined background layer, background layers of subsequent frames of the video stream;

performing iterative modifications on the image for subsequent frames of the video stream as portions of the obscured region are revealed, wherein the iterative modifications are performed until a fidelity level of the combined background layer satisfies a fidelity level criterion, wherein the fidelity level is based on an area of the combined background layer compared to an area of the image of the obscured region combined with the area of the combined background layer; and providing, during the video conference, the video stream with modified background layers for presentation on one or more client devices of one or more of the plurality of participants of the video conference.

9. The processing device of claim 8, wherein determining, during the video conference, the first background layer and the first foreground layer of the video stream comprises:

providing the first frame of the video stream as input to a machine learning model, wherein the machine learning model is trained to predict, based on a given frame, segmentation labels for the given frame that represent foreground and background regions of the given frame;

obtaining a plurality of outputs from the machine learning model, wherein the plurality of outputs comprises one or more background regions and one or more foreground regions;

combining the one or more background regions to obtain the first background layer; and combining the one or more foreground regions to obtain the first foreground layer.

10. The processing device of claim 8, wherein performing iterative modifications on the image for subsequent frames of the video stream as portions of the obscured region are revealed comprises:

determining a third background layer of a third frame of the video stream;

determining a shared region of the image that shares a common area with the third background layer; and modifying the image to replace a portion of the image corresponding to the shared region with a portion of the third background layer corresponding to the shared region.

11. The processing device of claim 10, further comprising ceasing the iterative modifications on the image in response to satisfying one or more criteria.

12. The processing device of claim 11, wherein the one or more criteria comprise the fidelity level criterion that is satisfied when the fidelity level exceeds a threshold fidelity level.

13. The processing device of claim 11, wherein the one or more criteria comprise at least one of exceeding a threshold amount of time or a threshold number of frames of the video stream.

14. The processing device of claim 11, further comprising resuming the iterative modifications on the image in response to detecting movement within the video stream.

15. A non-transitory computer-readable storage medium comprising instructions for a server that, when executed by a processing device, cause the processing device to perform operations comprising:

determining a first background layer and a first foreground layer of a first frame of a video stream provided by a client device associated with a participant of a plurality of participants of a video conference;

determining, during the video conference, a second background layer and a second foreground layer of a second frame of the video stream;

combining, during the video conference, the first background layer and the second background layer to obtain a combined background layer, wherein the combined background layer comprises a region obscured by both the first foreground layer and the second foreground layer;

performing, during the video conference and using a generative machine learning model, inpainting of the obscured region to obtain an image of the obscured region;

modifying, during the video conference and using the image of the obscured region and the combined background layer, background layers of subsequent frames of the video stream;

performing iterative modifications on the image for subsequent frames of the video stream as portions of the obscured region are revealed, wherein the iterative modifications are performed until a fidelity level of the combined background layer satisfies a fidelity level criterion, wherein the fidelity level is based on an area of the combined background layer compared to an area of the image of the obscured region combined with the area of the combined background layer; and providing, during the video conference, the video stream with modified background layers for presentation on one or more client devices of one or more of the plurality of participants of the video conference.

16. The non-transitory computer-readable storage medium of claim 15, wherein determining, during the video conference, the first background layer and the first foreground layer of the video stream comprises:

providing the first frame of the video stream as input to a machine learning model, wherein the machine learning model is trained to predict, based on a given frame, segmentation labels for the given frame that represent foreground and background regions of the given frame;

obtaining a plurality of outputs from the machine learning model, wherein the plurality of outputs comprises one or more background regions and one or more foreground regions;

combining the one or more background regions to obtain the first background layer; and combining the one or more foreground regions to obtain the first foreground layer.

17. The non-transitory computer-readable storage medium of claim 15, wherein performing iterative modifications on the image for subsequent frames of the video stream as portions of the obscured region are revealed comprises:

determining a third background layer of a third frame of the video stream;

determining a shared region of the image that shares a common area with the third background layer; and modifying the image to replace a portion of the image corresponding to the shared region with a portion of the third background layer corresponding to the shared region.

* * * * *